(12) United States Patent
Taylor

(10) Patent No.: US 8,202,143 B1
(45) Date of Patent: Jun. 19, 2012

(54) POULTRY PAW CUTTER AND RELATED METHODS

(75) Inventor: Timothy Taylor, Hawkinsville, GA (US)

(73) Assignee: Perdue Foods Products, Salisbury, MD (US)

( * ) Notice: Subject to any disclaimer, the term of this patent is extended or adjusted under 35 U.S.C. 154(b) by 0 days.

(21) Appl. No.: 13/286,705

(22) Filed: Nov. 1, 2011

(51) Int. Cl.
*A22C 18/00* (2006.01)

(52) U.S. Cl. ...................................................... 452/166

(58) Field of Classification Search .................. 452/149, 452/154, 166, 167
See application file for complete search history.

(56) References Cited

U.S. PATENT DOCUMENTS

| | | | |
|---|---|---|---|
| 5,460,567 A * | 10/1995 | Tieleman et al. | 452/167 |
| 6,450,872 B1 * | 9/2002 | Haley et al. | 452/166 |
| 6,749,497 B2 * | 6/2004 | Haley et al. | 452/167 |
| 7,378,642 B2 * | 5/2008 | Jones | 250/223 R |
| 7,573,018 B2 * | 8/2009 | Jones | 250/223 R |

* cited by examiner

*Primary Examiner* — Richard Price, Jr.
(74) *Attorney, Agent, or Firm* — Venable LLP; Steven J. Schwarz; Leigh D. Thelen

(57) ABSTRACT

A poultry paw cutting apparatus can include a conveyor that conveys a plurality of shackles. Each of the shackles can be adapted to hold a poultry paw. A chain can receive the poultry paws from the shackles at a first location and can convey the poultry paws substantially in unison with the shackles to a second location. The poultry paws can be released from the shackles at the second location. A paw cutting station can be positioned along the chain. A first guide member can be located along the chain substantially between the second location and the paw cutting station. The first guide member can be adapted to press the poultry paws against the chain. A method of cutting a poultry paw is also disclosed.

30 Claims, 9 Drawing Sheets

POULTRY PAW CUTTER AND RELATED METHODS

BACKGROUND OF THE INVENTION

This patent application relates generally to poultry processing, such as chickens and turkeys. More specifically, the present application relates to a poultry paw cutter and related methods for cutting and unloading poultry paws.

A particular concern of the poultry processing industry is to prevent poultry products from a condemned bird from being entered into the saleable product stream. In the poultry paw cutting sector, this concern is even higher due to current inconsistent and random control processes of the poultry paws during the unloading and cutting process. Due to these known control problems, processes are utilized to throw away several sets of poultry paws for each condemned bird. Specifically, the industry must discard the paw set from the actual condemned bird, as well as process inaccuracies dictating the number of neighboring paw sets on each side of the conveying line, to compensate for the high margin of error.

As a result, there is a need in the poultry industry to more precisely and efficiently remove and cut a poultry paw from a live bird paw shackle. Additionally or alternatively, there is a need to accurately control the location of each individual poultry paw and set of poultry paws through the removal and cutting processes.

SUMMARY

According to an embodiment, a poultry paw cutting apparatus may include a conveyor that conveys a plurality of shackles. Each of the shackles may be adapted to hold a poultry paw. The apparatus may further include a chain that receives the poultry paws from the shackles at a first location and conveys the poultry paws substantially in unison with the shackles to a second location. The poultry paws may be released from the shackles at the second location. The apparatus may include a paw cutting station positioned along the chain, and a first guide member located along the chain substantially between the second location and the paw cutting station. The first guide member may be adapted to press the poultry paws against the chain.

According to another embodiment, a poultry paw cutting apparatus may include a conveyor that conveys a plurality of shackles. Each of the shackles may be adapted to hold a poultry paw. The apparatus may include a chain that conveys the poultry paws from the shackles towards a paw cutting station. The apparatus may further include a transmission comprising an input that receives movement from the conveyor, and an output that rotates the chain in synchronization with the conveyor. The transmission may mechanically convert movement of the input to movement of the output.

According to a further embodiment, a method for cutting a poultry paw may include conveying a plurality of shackles on a conveyor. Each of the shackles may be adapted to hold a poultry paw. The method may include receiving the poultry paws from the shackles on a chain at a first location and conveying the poultry paws on the chain in unison with the shackles to a second location. The method may include releasing the poultry paws from the shackles at the second location. The method may also include pressing the poultry paws against the chain with a first guide member located along the chain substantially between the second location and the paw cutting station. The method may further include cutting a portion of the poultry paw at the paw cutting station.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Various embodiments of the invention are discussed in detail below. While specific embodiments are discussed, it should be understood that this is done for illustration purposes only. A person skilled in the relevant art will recognize that other components and configurations can be used without departing from the spirit and scope of the invention.

Figure 1:
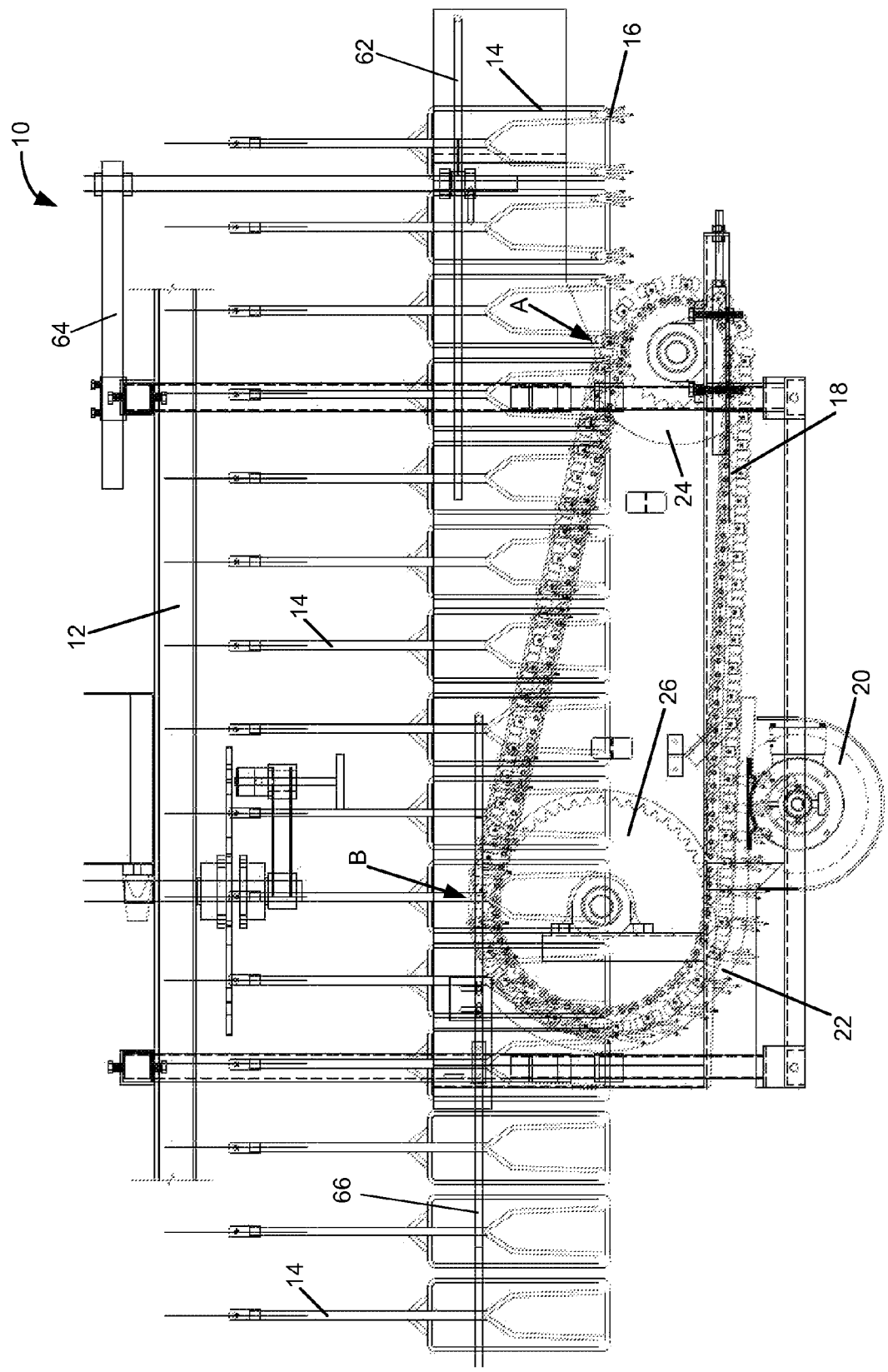
FIG. 1 depicts a front view of the poultry paw cutting apparatus, according to an embodiment of the present invention.

FIG. 1 depicts a front view of an embodiment of a poultry paw cutting apparatus. The poultry paw cutting apparatus 10 includes a conveyor 12 that conveys a plurality of shackles 14. Each of the shackles 14 can be adapted to hold a poultry paw 16, such as a chicken paw. The shackles 14, for example, as shown in FIG. 1, can each be adapted to hold two poultry paws 16. The poultry paw cutting apparatus 10 can further include a chain 18 that receives the poultry paws 16 from the shackles 14 at a first location A, and conveys the poultry paws 16 substantially in unison with the shackles 14 to a second location B. The shackles 14 can release the poultry paws 16 at the second location B. A paw cutting station 20 may be positioned along the chain 18, and a first guide member 22 may be located along the chain 18 substantially between the second location B and the paw cutting station 20. The first guide member 22 can be adapted to press the poultry paws 16 against the chain 18, thereby ensuring that the poultry paws 16 are securely held on the chain 18. The first guide member 22 may reduce or prevent the loss of poultry paws 16 during conveyance of the poultry paws 16 on the chain 18 to the cutting station 20.

According to an embodiment, a bird leg may include a shank portion and a paw portion. The cutting station 20 may remove the poultry paws 16 from the shank portion (not shown) of the bird's leg. Various cultures have long considered poultry paws to be a delicacy. The export of poultry paws in the United States has grown steadily over the last few years, most exports going to China, either directly or through Hong Kong. In view of the desirability of this product, and the high quality demanded by customers, an embodiment of the cutting station 20 may cut the poultry paws 16 off of the leg shank cleanly and to a precise length. The cutting station 20 may alternatively be adapted remove other portions of the bird leg or bird.

According to an embodiment, the first guide member 22 may maintain the poultry paws 16 in proper position as they are conveyed along the chain 18 through the paw cutting station 20. This may significantly reduce poultry paws from sliding or being skewed as they are conveyed through the rotating blade, preventing bad cuts and/or torn shanks.

According to an embodiment, the poultry paw cutting apparatus 10 may include a first sprocket 24 and a second sprocket 26 located downstream from the first sprocket 24. The first sprocket 24 and/or the second sprocket 26 may rotate the chain. The paw cutting station 20 may be located between the first sprocket 24 and the second sprocket 26. According to an embodiment, the first sprocket 24 may be a six-inch diameter sprocket and the second sprocket 26 may be a twelve-inch diameter sprocket, however other sizes and configurations are also possible. The center of the first sprocket 24 may be positioned approximately three feet from the center of the second sprocket 26, however other configurations are also possible. The second sprocket 26 may rotate counter-clockwise facing the poultry paw cutting apparatus 10. Other configurations are also possible.

Figure 2:
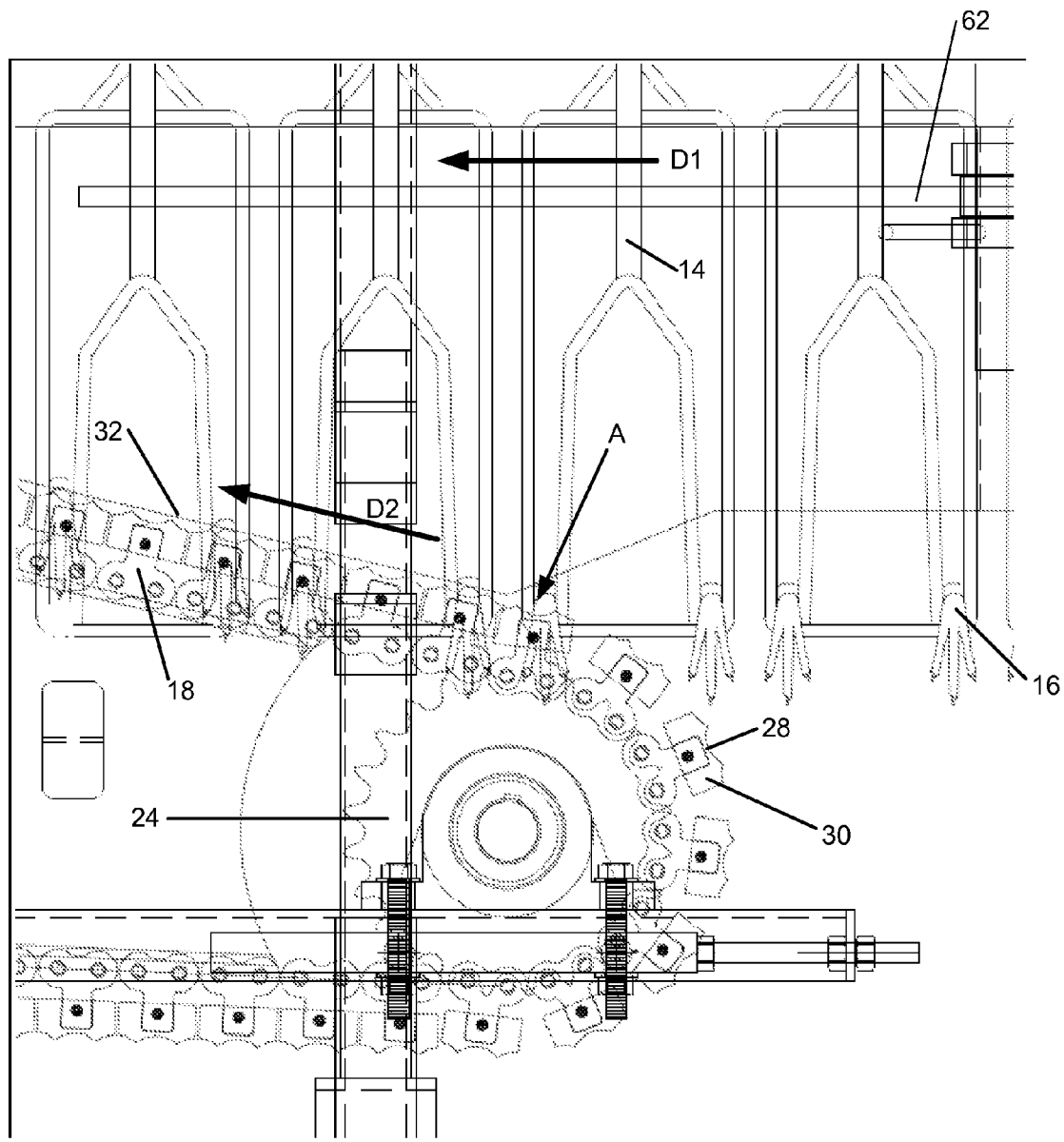
FIG. 2 depicts a detailed front view of a portion of the poultry paw cutting apparatus of FIG. 1.

FIG. 2 depicts a detailed front view of a portion the poultry paw cutting apparatus of FIG. 1. As shown, the chain 18 can rotate substantially about the circumference of the first sprocket 24 and can contact a chicken paw 16 on the shackle 14 at or near location A. According to an embodiment, the chain 18 may include a plurality of blocks 30 each including a recess 28 or other feature adapted to receive at least a portion of a poultry paw 16. The blocks 30, for example, may be made of ultra-high-molecular-weight polyethylene (UHMW) pieces attached at each link of chain 18.

The chain 18 and the shackle 14 may substantially move in unison towards location B, while both supporting and/or maintaining contact with the poultry paw 16. According to an embodiment, the conveyor 12 and the chain 18 may be inclined with respect to one another. For example, the conveyor 12 may be positioned along a horizontal axis and may convey the shackles 14 in a horizontal direction D1. A portion of chain 18, between the first location A and the second location B, for example, may be positioned along an inclined axis and may be conveyed in an inclined direction D2 with respect to the horizontal axis of the conveyor 12. The angle of incline may be, for example, in the range of about 5 degrees to about 65 degrees. The angle of incline can also be in the range of about 30 degrees to about 40 degrees. Alternatively, the angle of incline may be, for example, about a 35 degree incline. Other configurations are also possible.

According to an embodiment, the poultry paw cutting apparatus 10 may include a second guide member 32 positioned substantially parallel to the chain 18, for example, substantially from the first location A to the second location B. The second guide member 32 may be adapted to press the poultry paws 16 against the chain 18. The second guide member 32 may be a compression slot or a slotted guide bar having an edge or surface substantially parallel to the chain 18. According to an embodiment, the second guide member 32, for example, may be a slotted UHMW guide. The second guide member 32 may also include an angle of incline substantially equal to that of the chain 18 between location A and location B.

According to an embodiment, the second guide member may maintain control of each poultry paw 16 as it is transferred from the shackle 14 to the chain 18. This may significantly reduce the number of poultry paws 16 that do not properly convey to the chain 18, for example, whether falling off the shackle 14 or remaining in the shackle 14 after transfer.

Figure 3:
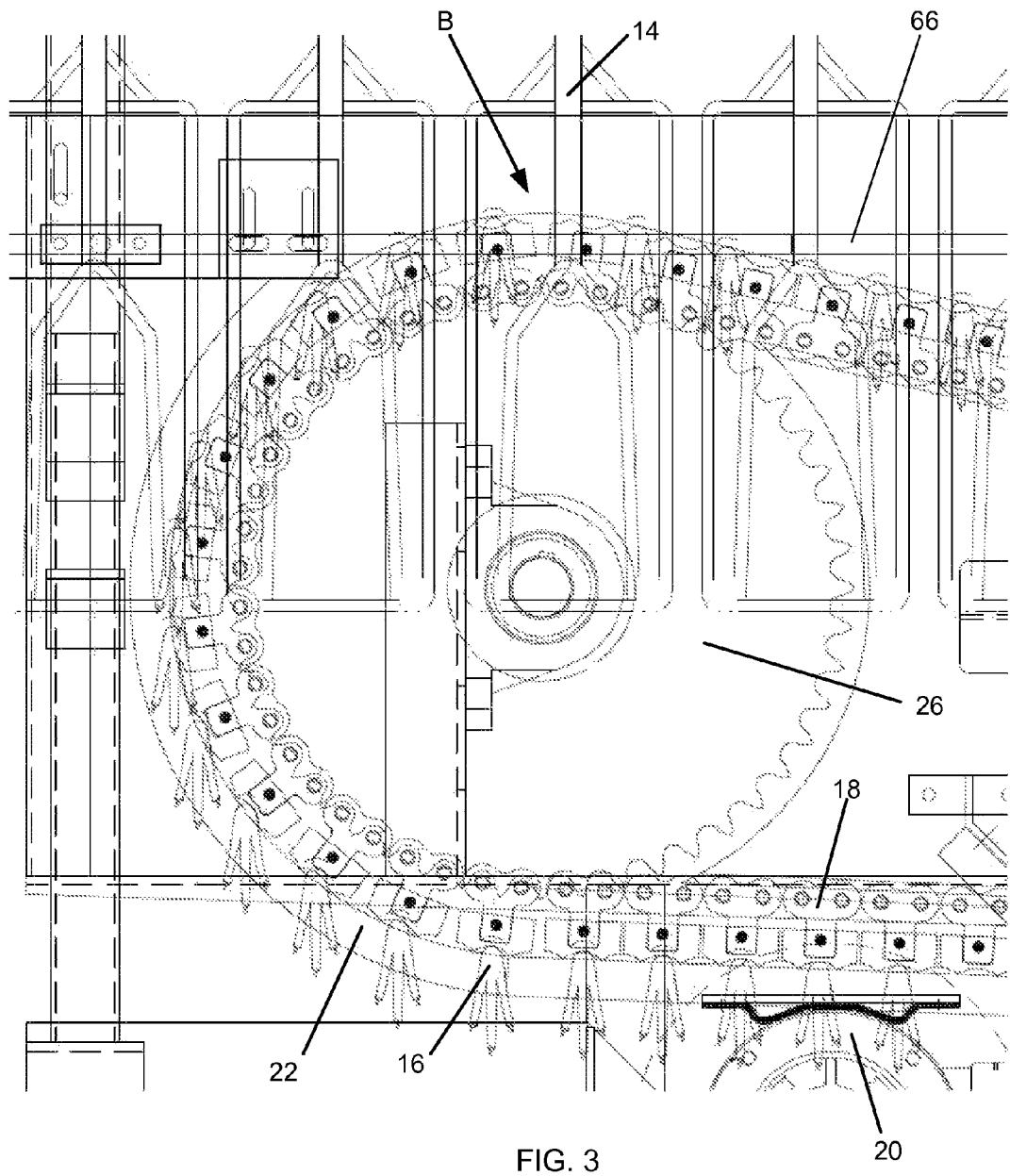
FIG. 3 depicts a detailed front view of another portion of the poultry paw cutting apparatus of FIG. 1.

FIG. 3 depicts a detailed front view of a portion of the poultry paw cutting apparatus of FIG. 1. As shown in FIG. 3, once the poultry paws 16 pass location B, they are released from the shackles 14 and are conveyed solely by the chain 18. The first guide member 22 may extend along at least a portion of the circumference of the second sprocket 26. The first guide member 22 may compress the poultry paw 16 against the chain 18, as the chain 18 moves in the downward rotation about the second sprocket 26. This may ensure that the poultry paws 16 remain in proper order on the chain 18. After the poultry paw 16 is rotated approximately 180 degrees, for example, the poultry paw 16 may be traveling in the reverse direction on the chain 18 towards the downstream paw cutting station 20.

Figure 4:
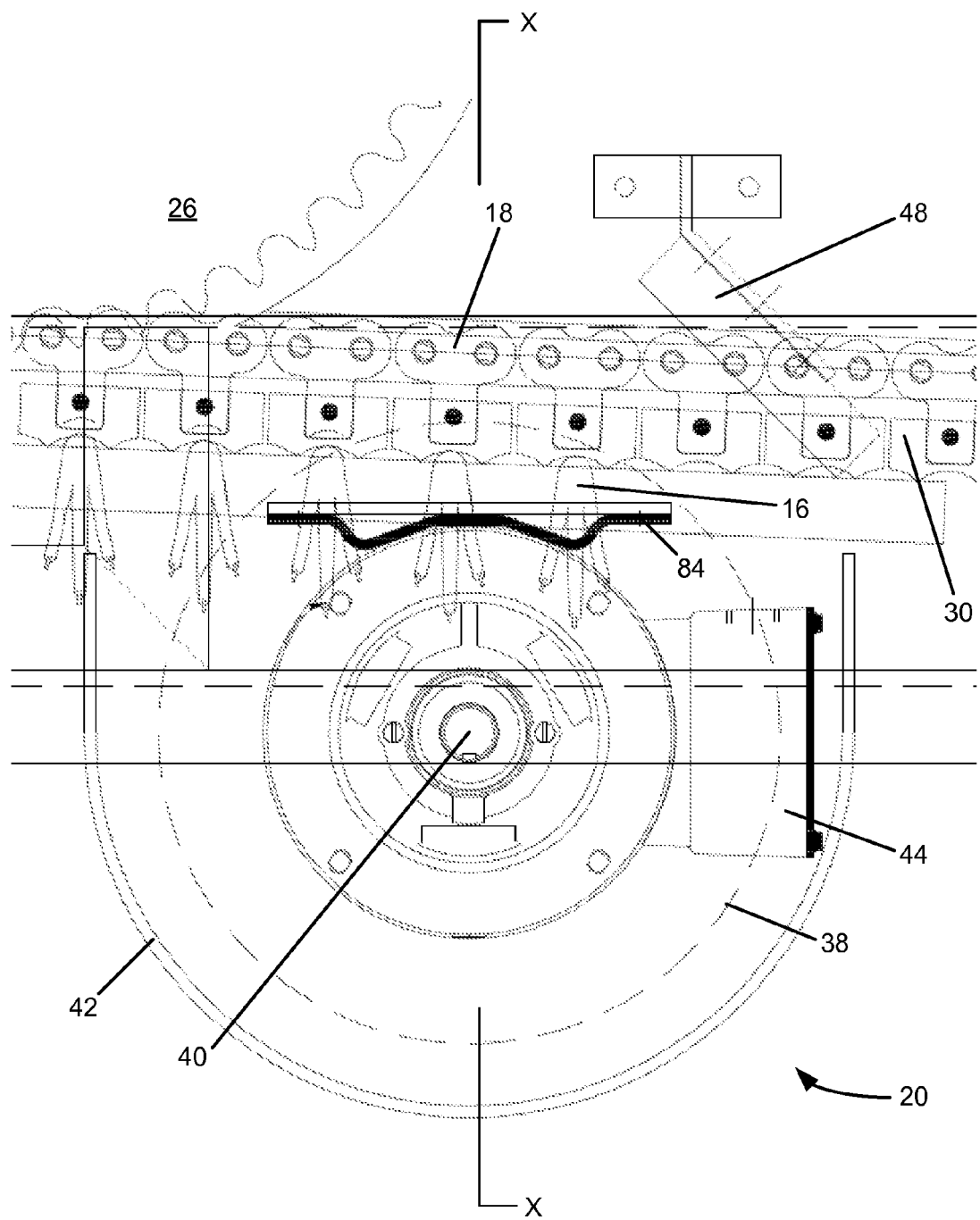
FIG. 4 depicts a detailed front view of a paw cutting station, according to an embodiment of the present invention.

FIG. 4 depicts a detailed front view of a paw cutting station, according to an embodiment of the present invention. As shown, the poultry paws 16, conveyed on chain 18, may be cut from the poultry leg shank (not shown) to a desired length by the paw cutting station 20. The cut poultry paw 16 may be dropped through a chute with an actuating door (not shown), or otherwise collected. The leg shank may be discarded and fed into a disposal process (not shown). The paw cutting station may comprise a rotating blade 38, or another cutting device. The rotating blade 38 may be rotated around shaft 40 by a separate drive motor 44. A protective covering 42 may surround the blade 38. Additionally, a M-shaped guard 84 may be positioned parallel and in close proximity to the blade 38 in the cutting area. The guard 84 may prevent an operator from inserting his or her hand into the cutting area during operation. Although all of the leg shanks should fall off the chain 18 by gravity after the cutting process, a separator device 48 may be positioned upstream of the paw cutting station 20 to push any remaining leg shanks off the chain 18 and into the disposal system. After the cutting process, the chain 18 may continue to move forward without conveying a poultry paw 16 until it reaches the first sprocket 24 and rotates to location A, where it receives a new poultry paw 16.

Figure 5:
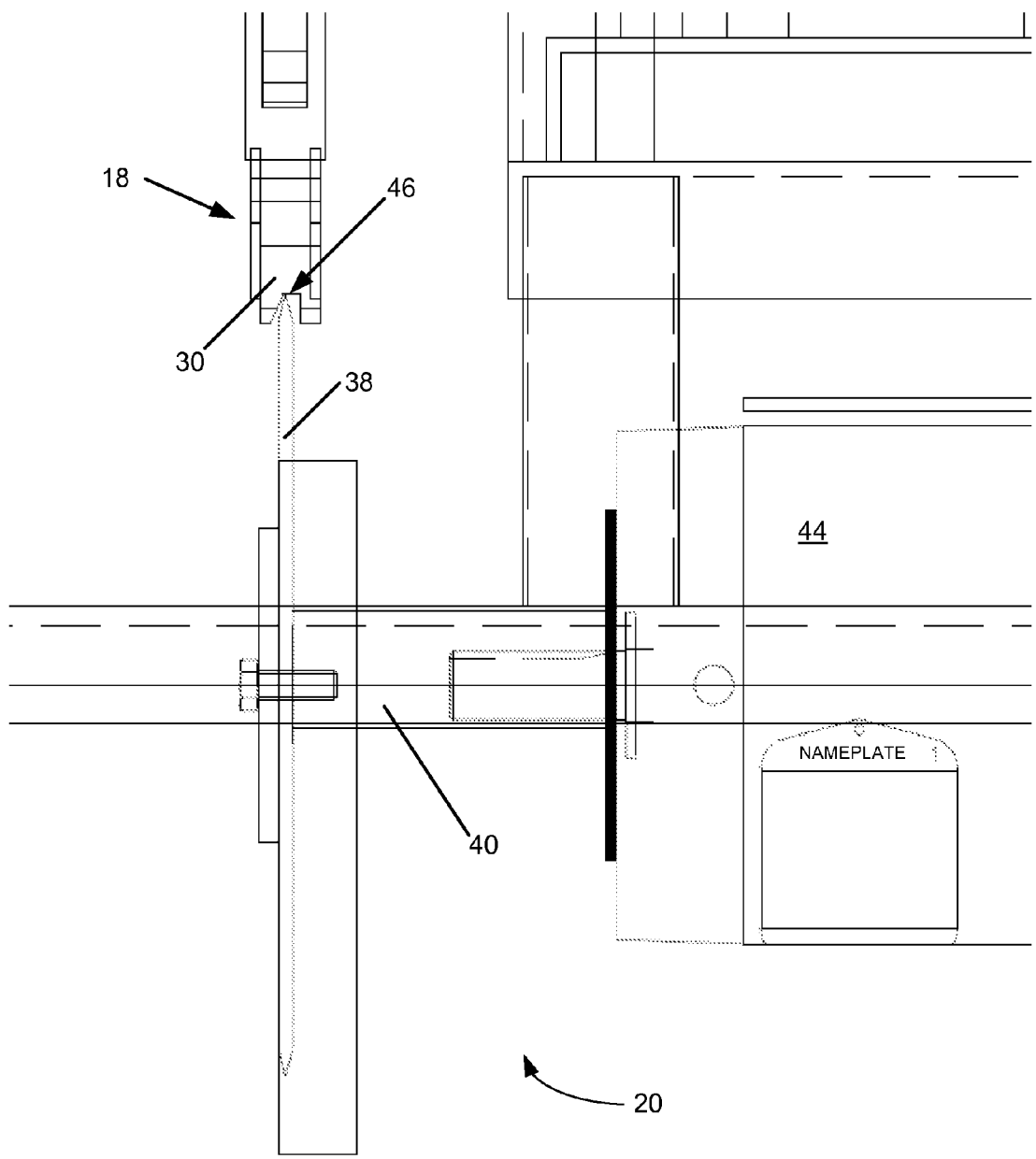
FIG. 5 depicts a cross-sectional view of the paw cutting station of FIG. 4, taken along line X-X of FIG. 4.

FIG. 5 depicts a cross-sectional view of section X-X of the paw cutting station of FIG. 4. In this embodiment, each block 30 of chain 18 may include a slot 46 that is adapted to receive the blade 38 of the paw cutting station 20. When a poultry paw 16 is supported on the block 30, the blade 38 rotating through slot 46 will cleanly and consistently cut through the poultry paw 16 to sever the paw from the shank (not shown).

Figures 6, 6A:
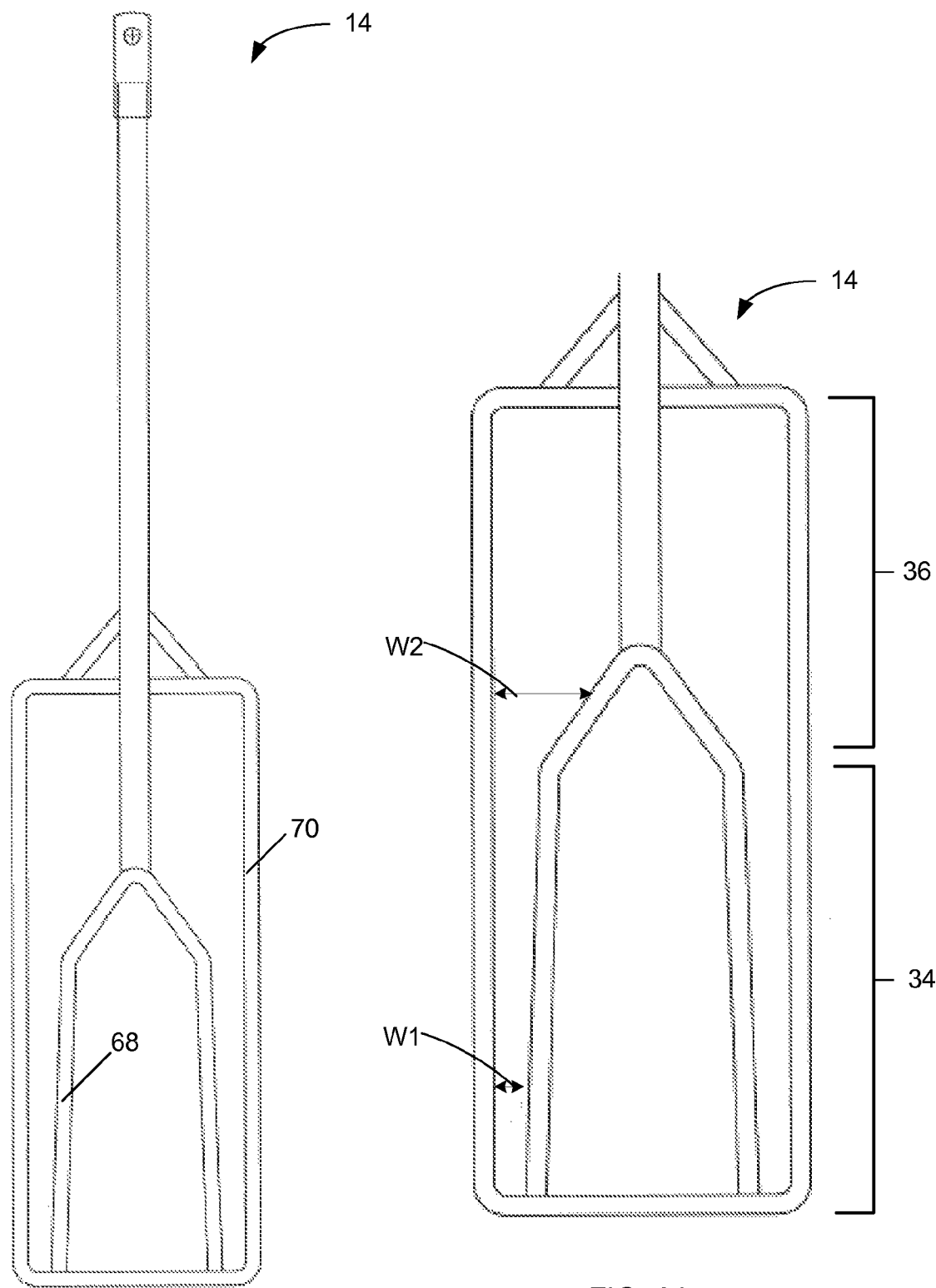
FIG. 6 depicts a front view of a shackle, according to an embodiment of the present invention.
FIG. 6A depicts a detailed front view of a portion of the shackle of FIG. 6.

FIG. 6 depicts a front view of a shackle, according to an embodiment. FIG. 6A depicts a detailed front view of a portion of the shackle of FIG. 6. Each shackle 14 may comprise a pair of first and second substantially upright members 68, 70. The shackles 14 may define a lower portion 34 and an upper portion 36. The lower portion 34 can define a width W1 between the first and second substantially upright members 68, 70 that is dimensioned to retain the paw 16 on the shackle 14 for conveyance. The upper portion 36 can define a width W2 between the first and second substantially upright members 68, 70 that is wider than the width W1 and will release the paw 16 from the shackle 14, for example, after the paw 16 travels upward in the shackle 14. Although the shackle 14 is shown as having a pair of substantially upright members 68, 70, alternative embodiments may have only a single substantially upright member, or more than one pair of substantially upright members.

Figure 7:
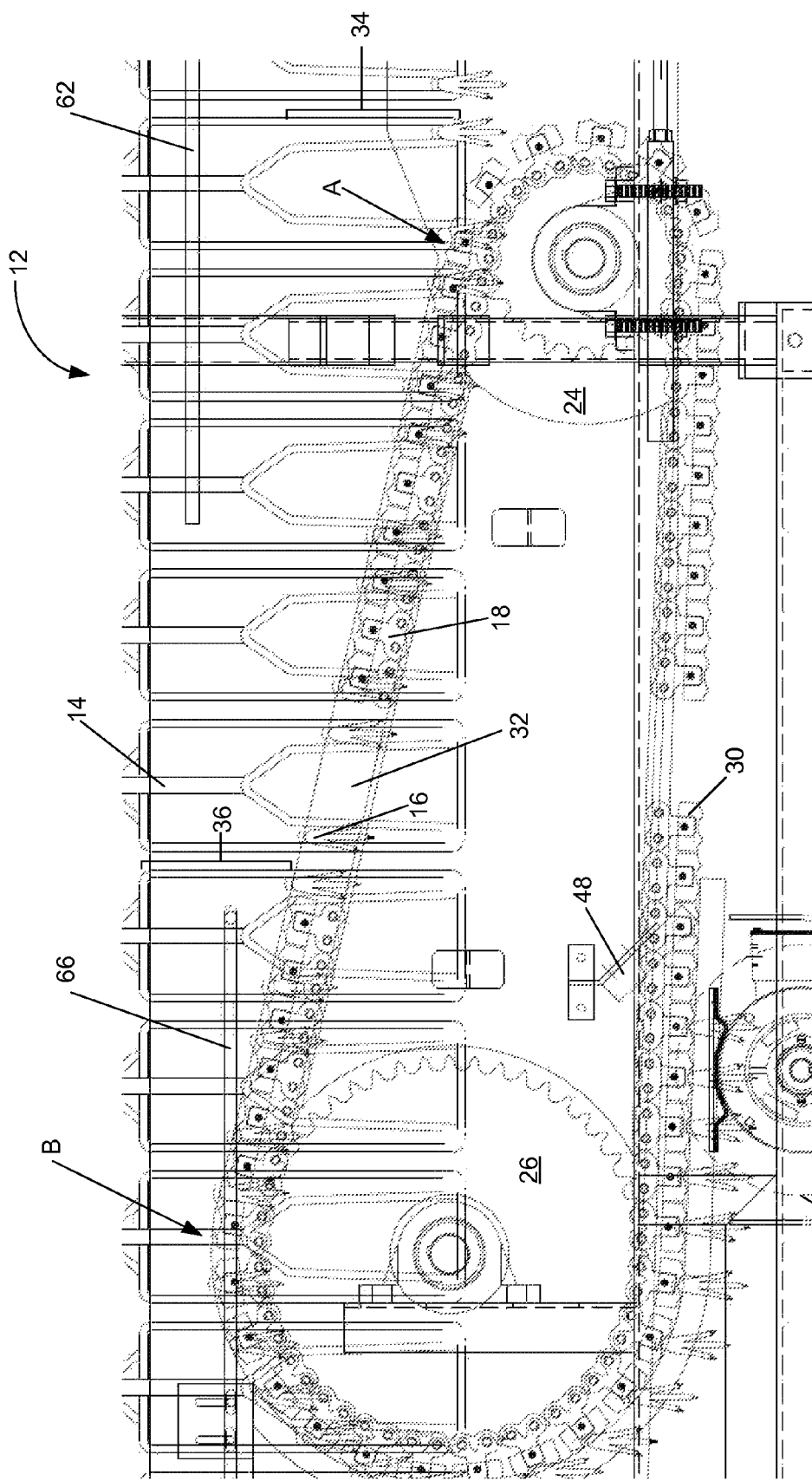
FIG. 7 depicts a front view of the poultry paw cutting apparatus, according to an embodiment of the present invention.

FIG. 7 depicts a front view of the poultry paw cutting apparatus, according to an embodiment. As shown in FIG. 7, the use of an inclined section of chain 18 between the first location A and the second location B may allow the poultry paw 16 to gradually lift from the lower portion 34 to the upper portion 36 of the shackle 14 at or prior to release at the second location B. The upper portion 36 of the shackle 14 can define width W2 wider than the diameter of the leg shank of the poultry paw 16, thus by the time the poultry paw 16 reaches location B on the chain 18, it may be substantially unsupported by the shackle 14 and may be freely conveyed by the chain 18.

As previously mentioned, a second guide member 32 may assist in transitioning each poultry paw 16 from the first location A to the second location B to ensure the poultry paws 16 are not lost during the transition. An embodiment where the second guide member 32 comprises a slot is more clearly shown in FIG. 7, where a portion of the chain 18 is removed for illustration purposes.

Figure 8:
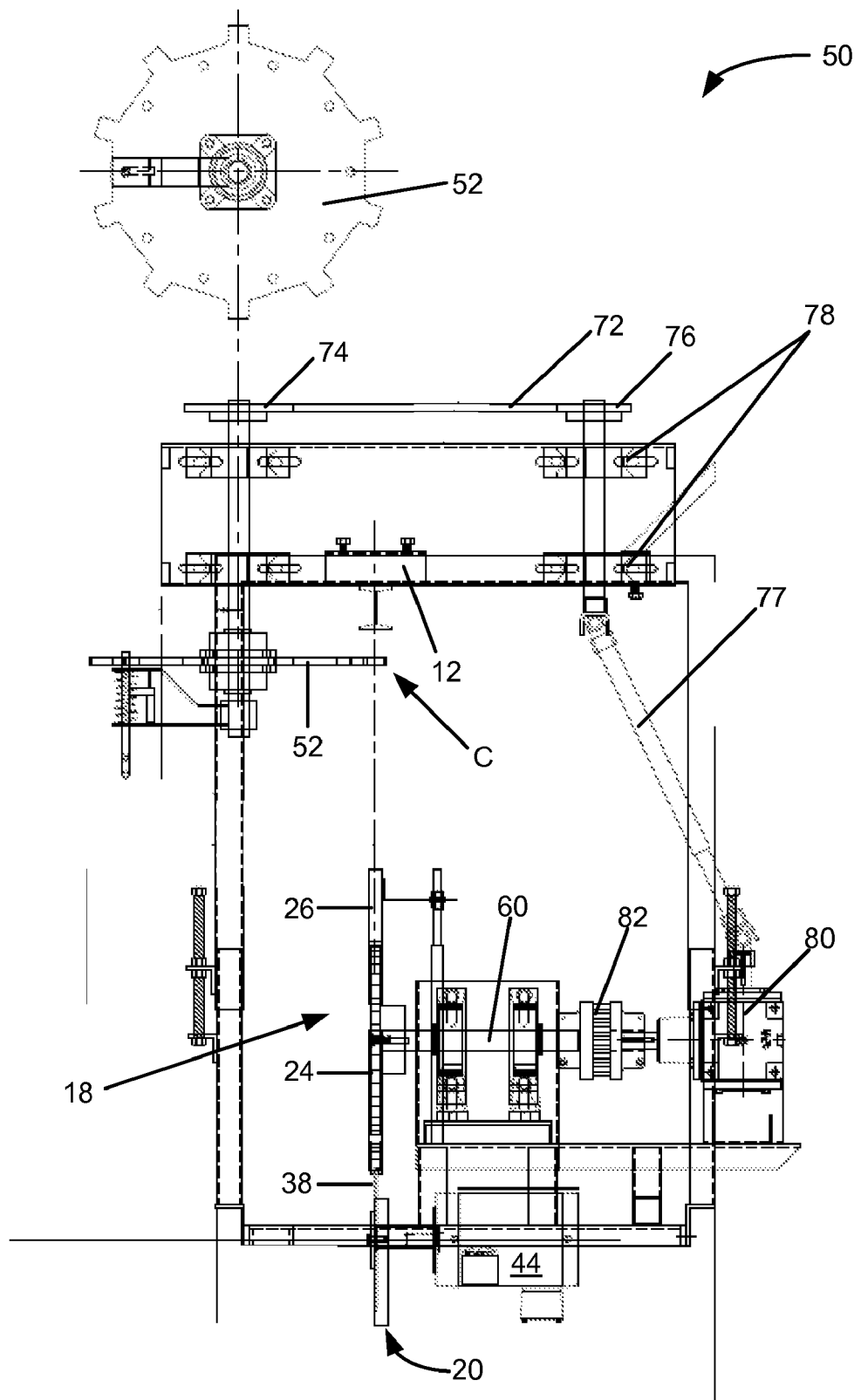
FIG. 8 depicts a side view of a transmission system of the paw cutting apparatus, according to an embodiment of the present invention.

FIG. 8 depicts a side view of a transmission system of the paw cutting apparatus, according to an embodiment. As described above, the poultry paw cutting apparatus 10 may include a conveyor 12 that conveys a plurality of shackles 14, each adapted to hold a poultry paw 16, and a chain 18 that conveys the poultry paws 16 from the shackles 14 towards a paw cutting station 20. According to an embodiment, movement of the conveyor 12 can drive the chain 18, thereby improving synchronization between the shackles 14 and the chain 18. For example, paw cutting apparatus 10 may include a transmission 50, where the transmission 50 comprises an input that receives movement from the conveyor 12 and an output that moves the chain 18 in synchronization with the conveyor 12.

According to an embodiment, the output of the transmission 50 may comprise at least one of the first sprocket 24 and the second sprocket 26 to rotate the chain 18. The input of the transmission 50 may comprise a gear 52 in engagement with a portion of the conveyor 12, where the gear 52 is coupled for rotation to at least one of the first sprocket 24 and the second sprocket 26, for example, by at least one shaft 60. For example, the gear 52 may comprise a star wheel or a chain-driven rotating star wheel. The gear 52 may rotate based on the movement of the conveyor 12. The transmission 50 may enable the chain 18 and the conveyor 12 to move in synchronization, and may maintain control of the exact location of each poultry paw 16 through the cutting process.

In the embodiment shown in FIG. 8, movement of the conveyor 12 may rotate the gear 52, which may be engaged with the conveyor 12 at location C. The rotation of the gear 52 may cause a first pulley 74 to rotate a belt 72 about a second pulley 76. A shaft 77 coupled to second pulley 76 may pass the rotational movement of the second pulley 76 to gear box 80. Shaft 77 may be supported, for example, by bearings 78. The gear box 80 may use gears and/or gear trains to provide speed and torque conversions of the rotational movement from the rotating shaft 77 into a second gear box 82, for example, a speed reducer. The second gear box 82 may include a gear train that rotates more slowly than the input gear of the gear box 80 and/or may amplify the input torque. The output of the second gear box 82 may rotate shaft 60, which may rotate at least one of the first and second sprockets 24, 26. The first and second sprockets 24, 26 may, in turn, rotate the chain 18.

One of ordinary skill in the art will recognize from this disclosure that other mechanical transmission systems can be used to synchronize movement of the conveyor 12 and the chain 18. Additionally, an alternative embodiment may use independent drive systems for the conveyor 12 and the chain 18 that can be synchronized, for example, using an electronic control system.

According to an embodiment, the mechanical coupling may synchronize the movement between the shackles 14 and the chain 18, further aiding in the control of movement of the shackles 14 with movement of the chain 18, and transfer of poultry paws 16 from the shackles 14 to the chain 18 and through the paw cutting-station 20. This may reduce the number of poultry paws discarded through the process.

Figure 9:
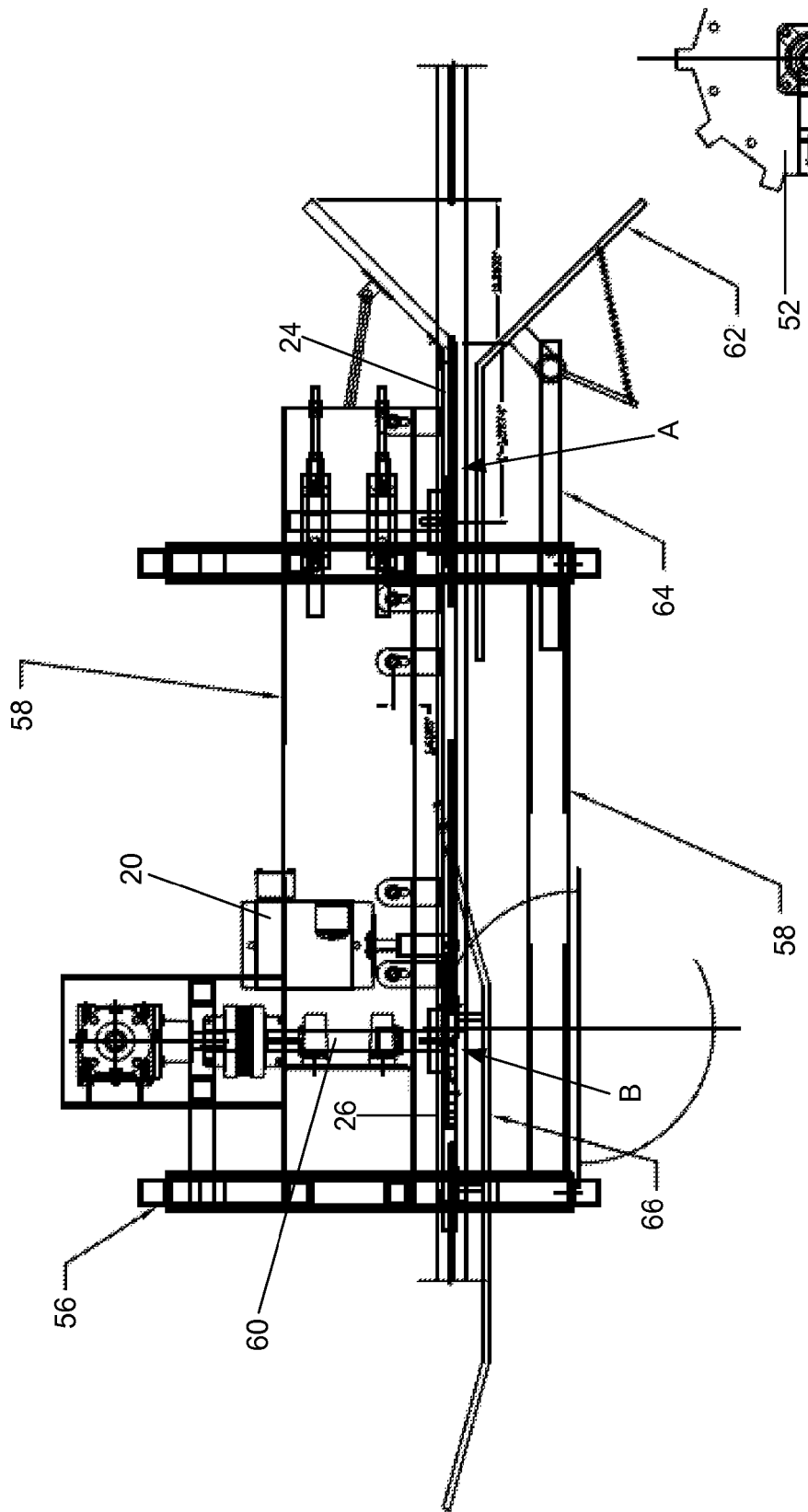
FIG. 9 depicts a top view of the transmission system of FIG. 8.

FIG. 9 depicts a top view of the poultry paw cutting apparatus 10. As shown, a first guide bar 62 may be positioned, via a pivot arm 64, in close proximity to the first sprocket 24 to guide the shackles 14 towards the chain 18 near location A. A second guide bar 66 may be positioned in close proximity to the second sprocket 26 to guide the shackles 14 away from the chain 18 near location B at or around the time the paws 16 are released from the shackles 14. According to an embodiment, the second guide bar 66 may be stationary. The movement of each shackle 14 away from the chain 18 can allow the poultry paws 16 to clear the upper portion 36 of the shackle 14 to be conveyed solely by the chain 18. The first and second guide bars 62 and 66 are further shown in FIGS. 1, 2, 3 and 7.

According to an embodiment and with reference to FIG. 7, a method for cutting a poultry paw 16 may include conveying a plurality of shackles 14 on conveyor 12, where each of the shackles 14 may be adapted to hold one or more poultry paws 16. The method may include receiving the poultry paws 16 from the shackles 14 on a chain 18 at first location A, and conveying the poultry paws 16 on the chain 18 substantially in unison with the shackles 14 to second location B. There, the poultry paws 16 may be released from the shackles 14 at the second location B. The method may further include pressing the poultry paws 16 against the chain 18 with a first guide member 22 located along the chain 18 as they are transported between the second location B and the paw cutting station 20.

The method may include pressing the poultry paws 16 against the chain 18 from substantially the first location A to substantially the second location B using a second guide member 32 positioned substantially parallel to the chain 18 substantially from the first location A to the second location B, however other embodiments are possible.

According to an embodiment, the method may include receiving the poultry paws 16 on the chain 18 via a plurality of blocks 30 each including a recess 28 adapted to receive at least a portion of a poultry paw 16. According to an embodiment, the conveyor 12 and the chain 18 may be inclined with respect to one another.

Still referring to FIG. 7, the method may include rotating the chain 18 via a first sprocket 24 and a second sprocket 26 located downstream from the first sprocket 24. The paw cutting station 20 may be located between the first sprocket 24 and the second sprocket 26. According to an embodiment, the first guide member 22 may surround at least a portion of the circumference of the second sprocket 26.

According to an embodiment, the method may include cutting each poultry paw 16 using a blade 38 of the paw cutting station 20. The chain 18 may include a plurality of blocks 30 each having a slot 46, where the blade 38 of the paw cutting station 20 may cut each poultry paw 16 through the slot 46 of each block 30.

According to an embodiment, the method may include driving the chain 18 in synchronization with the conveyor 12 via a transmission system 50. Driving the chain 18 may include rotating an input, for example a star gear 52, in engagement with a portion of the conveyor 12, and converting movement from the input member 52 to movement of at least one of the first sprocket 24 and the second sprocket 26. Such movement may rotate a shaft 60 coupled to one of the first sprocket 24 and the second sprocket 26 to rotate the chain 18.

According to an embodiment, the apparatuses and methods described herein may greatly increase individual control of each poultry paw that is removed and cut from the leg shanks. Instead of throwing away fourteen poultry paws for each condemned bird, as currently is the practice, the present invention may reduce this number to four poultry paws that must be thrown away for each condemned bird (the condemned pair and one poultry paw on either side of the condemned pair). Thus, it may be possible that ten poultry paws be saved.

While various embodiments of the present invention have been described above, it should be understood that they have been presented by way of example only, and not limitation. Thus, the breadth and scope of the present invention should not be limited by any of the above-described embodiments, but should instead be defined only in accordance with the following claims and their equivalents.

What is claimed:

1. A poultry paw cutting apparatus, comprising:
   a conveyor that conveys a plurality of shackles, wherein each of the shackles is adapted to hold a poultry paw;
   a chain that receives the poultry paws from the shackles at a first location, and conveys the poultry paws substantially in unison with the shackles to a second location, wherein the poultry paws are released from the shackles at the second location;
   a paw cutting station positioned along the chain; and
   a first guide member located along the chain substantially between the second location and the paw cutting station, wherein the first guide member is adapted to press the poultry paws against the chain.

2. The poultry paw cutting apparatus of claim 1, further comprising a second guide member extending substantially parallel to a portion of the chain substantially from the first location to the second location, wherein the second guide member is adapted to press the poultry paws against the chain.

3. The poultry paw cutting apparatus of claim 2, wherein the second guide member comprises a compression slot.

4. The poultry paw cutting apparatus of claim 1, wherein the chain comprises a plurality of blocks each including a recess adapted to receive at least a portion of a poultry paw.

5. The poultry paw cutting apparatus of claim 1, wherein the conveyor and the chain are inclined with respect to one another.

6. The poultry paw cutting apparatus of claim 1, further comprising a first sprocket and a second sprocket located downstream from the first sprocket, wherein at least one of the first sprocket and the second sprocket rotate the chain, and wherein the paw cutting station is located between the first sprocket and the second sprocket.

7. The poultry paw cutting apparatus of claim 6, wherein the first guide member extends around at least a portion of the circumference of the second sprocket.

8. The poultry paw cutting apparatus of claim 1, wherein each shackle comprises at least one shackle portion including first and second upright members, wherein the shackle portion includes an upper portion and a lower portion, the lower portion defining a width between the first and second upright members that is dimensioned to retain the paw on the shackle, and the upper portion defining a width between the first and second upright members that is wider than the width of the lower portion to release the paw from the shackle.

9. The poultry paw cutting apparatus of claim 1, wherein the paw cutting station comprises a rotating blade.

10. The poultry paw cutting apparatus of claim 9, wherein the chain includes a plurality of blocks, and each block includes a slot, wherein the rotating blade cuts each poultry paw through the slots.

11. The poultry paw cutting apparatus of claim 1, further comprising a transmission including an input member that receives movement from the conveyor, wherein the transmission converts movement from the input member to movement of the chain substantially in synchronization with the conveyor.

12. A poultry paw cutting apparatus, comprising:
    a conveyor that conveys a plurality of shackles, wherein each of the shackles is adapted to hold a poultry paw;
    a chain that conveys the poultry paws from the shackles towards a paw cutting station; and
    a transmission comprising an input that receives movement from the conveyor, and an output that rotates the chain in synchronization with the conveyor, wherein the transmission mechanically converts movement of the input to movement of the output.

13. The poultry paw cutting apparatus of claim 12, further comprising a first sprocket and a second sprocket located downstream from the first sprocket, wherein the first sprocket and the second sprocket rotate the chain, and wherein the output comprises at least one of the first sprocket and the second sprocket.

14. The poultry paw cutting apparatus of claim 13, wherein the input comprises a gear in engagement with a portion of the conveyor, wherein the gear is coupled to at least one of the first sprocket and the second sprocket by at least one shaft.

15. The poultry paw cutting apparatus of claim 12, wherein the chain is adapted to receive the poultry paws from the shackles at a first location, convey the poultry paws substantially in unison with the shackles to a second location, and release the poultry paws from the shackles at the second location.

16. The poultry paw cutting apparatus of claim 15, further comprising a first guide member located along the chain substantially between the second location and the paw cutting station, wherein the first guide member is adapted to press the poultry paws against the chain.

17. The poultry paw cutting apparatus of claim 16, wherein the first guide member extends around at least a portion of the circumference of the second sprocket.

18. The poultry paw cutting apparatus of claim 15, further comprising a second guide member extending substantially parallel to a portion of the chain substantially from the first location to the second location, wherein the second guide member is adapted to press the poultry paws against the chain.

19. The poultry paw cutting apparatus of claim 12, wherein the conveyor and the chain are inclined with respect to one another.

20. The poultry paw cutting apparatus of claim 12, wherein the chain includes a plurality of blocks, and each block includes a slot, wherein the paw cutting station comprises a blade that cuts each poultry paw through the slot of the chain.

21. A method for cutting a poultry paw, comprising:
    conveying a plurality of shackles on a conveyor, wherein each of the shackles is adapted to hold a poultry paw;
    receiving the poultry paws from the shackles on a chain at a first location;
    conveying the poultry paws on the chain in unison with the shackles to a second location;

releasing the poultry paws from the shackles at the second location;

pressing the poultry paws against the chain with a first guide member located along the chain substantially between the second location and a paw cutting station; and cutting a portion of the poultry paw at the paw cutting station.

22. The method of claim 21, further comprising pressing the poultry paws against the chain from the first location to the second location using a first guide member extending substantially parallel to the chain substantially from the first location to the second location.

23. The method of claim 21, further comprising receiving the poultry paws on the chain via a plurality of blocks each including a recess adapted to receive at least a portion of a poultry paw.

24. The method of claim 21, wherein the conveyor and the chain are inclined with respect to one another.

25. The method of claim 21, further comprising rotating the chain via a first sprocket and a second sprocket located downstream from the first sprocket, wherein the paw cutting station is located between the first sprocket and the second sprocket.

26. The method of claim 25, wherein the first guide member extends around at least a portion of the circumference of the second sprocket.

27. The method of claim 21, wherein the chain includes a plurality of blocks each having a slot, and wherein the blade of the paw cutting station cuts each poultry paw through the slot of each block.

28. The method of claim 25, further comprising driving the chain in synchronization with the conveyor via a transmission system.

29. The method of claim 28, wherein driving the chain comprises:

rotating an input member in engagement with a portion of the conveyor; and mechanically imparting movement from the input member to at least one of the first sprocket and the second sprocket.

30. The method of claim 28, further comprising rotating a shaft coupled to one of the first sprocket and the second sprocket via the transmission system.

\* \* \* \* \*